US007542651B2

(12) United States Patent
Lewallen et al.

(10) Patent No.: US 7,542,651 B2
(45) Date of Patent: Jun. 2, 2009

(54) FIBER OPTIC CABLE ASSEMBLIES INCLUDING REMOTE TETHER RELEASE APPARATUS

(75) Inventors: Christopher Paul Lewallen, Hudson, NC (US); James P. Luther, Hickory, NC (US); Robert B. Elkins, II, Hickory, NC (US); Lars K. Nielsen, Denver, NC (US); Joseph Cody, Hickory, NC (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 11/540,891

(22) Filed: Sep. 29, 2006

(65) Prior Publication Data

US 2008/0080830 A1    Apr. 3, 2008

(51) Int. Cl.
G02B 6/00    (2006.01)
(52) U.S. Cl. .................. 385/136; 385/134; 385/137; 385/139
(58) Field of Classification Search .............. None
See application file for complete search history.

(56) References Cited

U.S. PATENT DOCUMENTS

| 4,884,863 | A |   | 12/1989 | Throckmorton ........... 350/96.2 |
| 4,961,623 | A |   | 10/1990 | Midkiff et al. ............. 350/96.2 |
| 5,042,901 | A |   | 8/1991 | Merriken et al. ............ 385/135 |
| 5,121,458 | A |   | 6/1992 | Nilsson et al. .............. 385/100 |
| 5,125,060 | A | * | 6/1992 | Edmundson ................ 385/100 |
| 5,210,812 | A | * | 5/1993 | Nilsson et al. .............. 385/100 |
| 5,440,665 | A |   | 8/1995 | Ray et al. ................... 385/135 |
| 5,528,718 | A |   | 6/1996 | Ray et al. ................... 385/136 |
| 5,657,413 | A |   | 8/1997 | Ray et al. ................... 385/139 |
| 5,778,122 | A |   | 7/1998 | Giebel et al. ................. 385/55 |
| 5,892,870 | A |   | 4/1999 | Fingler et al. ................ 385/59 |
| RE36,592 | E |   | 2/2000 | Giebel et al. ................ 385/100 |
| RE37,028 | E |   | 1/2001 | Cooke et al. ................ 385/112 |
| 6,621,975 | B2 |   | 9/2003 | Laporte et al. .............. 385/135 |
| 7,326,075 | B1 | * | 2/2008 | Armstrong et al. .......... 439/354 |

(Continued)

FOREIGN PATENT DOCUMENTS

DE    202004009156    12/2005

(Continued)

OTHER PUBLICATIONS

Tyco Electronics Raychem Product Sheet, FITS FOSC—Factory Installed Termination System for Fiber Optic Cable Splices, 1999, 2 pages.

(Continued)

*Primary Examiner*—Sung H Pak
*Assistant Examiner*—Chad H Smith

(57) ABSTRACT

A cable assembly comprising a first fiber optic cable, a second fiber optic cable attached to the first fiber optic cable, and an apparatus for remotely releasing at least a portion of the second fiber optic cable from attachment to the first fiber optic cable. A cable assembly comprising a distribution cable, a tether cable attached and optically interconnected to the distribution cable at a first position, and removably attached to the distribution cable at one or more second positions, and a tether cable release apparatus for remotely releasing at least a portion of the tether cable from the distribution cable to allow the tether and a tethered assembly to be pulled to a predetermined location within a network.

24 Claims, 14 Drawing Sheets

U.S. PATENT DOCUMENTS

| | | | |
|---|---|---|---|
| 2002/0181905 A1* | 12/2002 | Yoshida et al. | 385/100 |
| 2003/0118295 A1* | 6/2003 | Lail et al. | 385/101 |
| 2005/0129375 A1* | 6/2005 | Elkins et al. | 385/100 |
| 2005/0259928 A1 | 11/2005 | Elkins, II et al. | 385/100 |

FOREIGN PATENT DOCUMENTS

| | | |
|---|---|---|
| JP | 2001-116968 | 4/2001 |
| WO | WO90/15350 | 12/1990 |

OTHER PUBLICATIONS

Patent Cooperation Treaty, International Search Report for International Application No. PCT/US07/021151, Mar. 31, 2008, 3 pages.

* cited by examiner

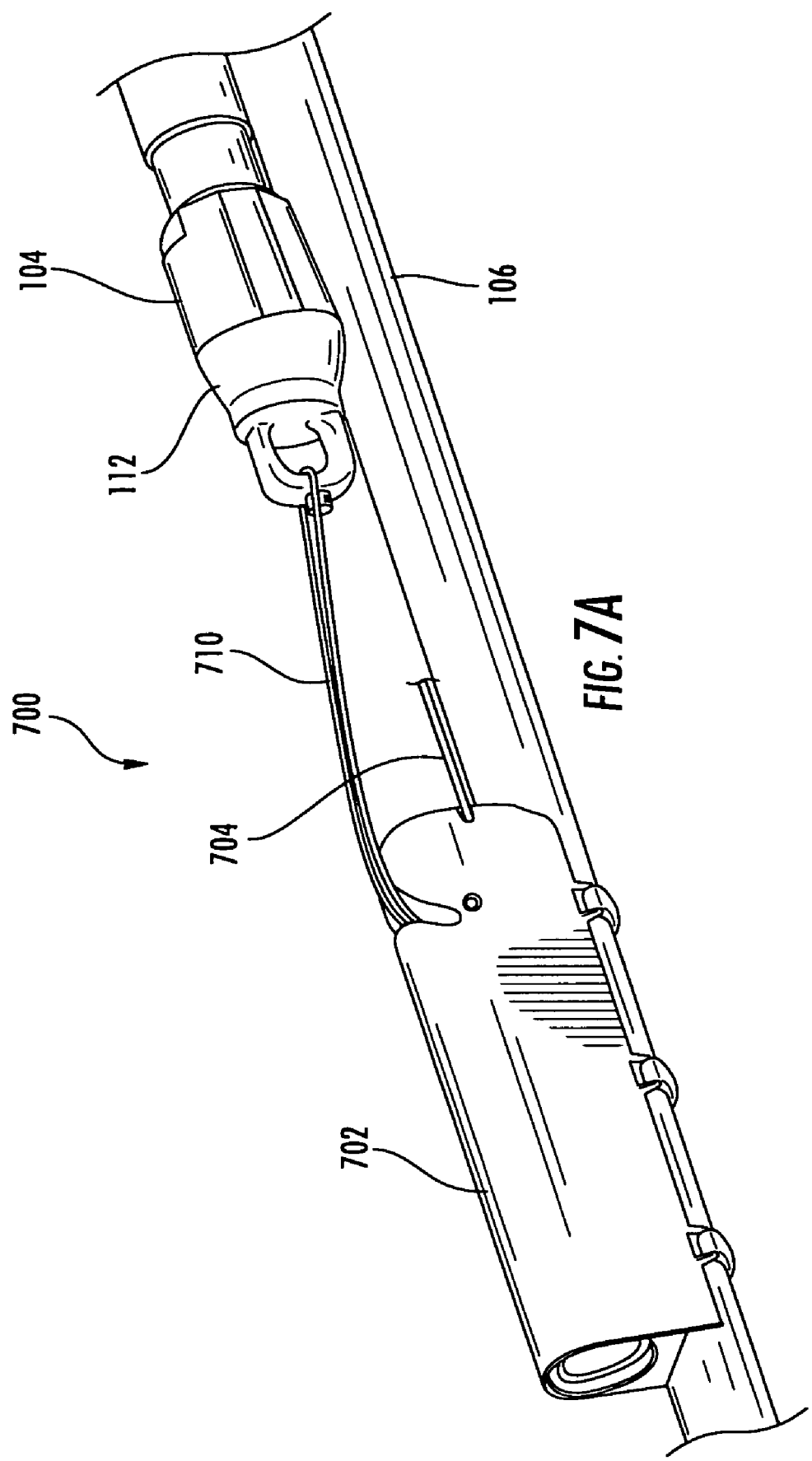

FIBER OPTIC CABLE ASSEMBLIES INCLUDING REMOTE TETHER RELEASE APPARATUS

BACKGROUND OF THE INVENTION

1. Field of the Invention

The present invention relates generally to various apparatus for remotely releasing tethered assemblies of fiber optic cable assemblies, and more specifically, to various apparatus for remotely releasing tethers and tethered assemblies interconnected at Flexible Network Access Points ("FlexNAP" or "FNAPP") along a distribution cable in order to access the tethers and tethered assemblies at a vault, hand hole, man hole, other structure or remote location within an optical network.

2. Technical Background

In "Fiber-to-the-Premises" (FTTP) and other optical networks, referred to generically herein as "FTTx" networks, pre-engineered fiber optic distribution cables including FlexNAPs are being developed and deployed to facilitate the delivery of services to subscribers over a plug-and-play network. The most recently developed FlexNAP systems typically include distribution cables having pre-selected optical fibers terminated, also referred to herein as "pre-terminated", and accessed from the distribution cable at an access point, and routed separately away from the distribution cable to provide branches, referred to herein as "tap points," "midspan access locations," "branch points" or "tether attach points." At these tap points, the pre-selected and pre-terminated optical fibers of the distribution cable are often spliced or otherwise optically connected to a length of optical cable referred to herein as a "tether." The tether may terminate in a connection terminal, or may be used to provide optical fiber to an optical connection terminal, network interface device or other optical network terminal located within reach of the tether. The tether may also be used for mitigating span length measurement issues resulting from errors in pre-engineered cable assembly installations. The tether is typically lashed to the distribution cable during assembly and installation and released as needed.

Several methods for FlexNAP system deployment currently exist including, but not limited to, aerial drive-off, aerial pull-through, buried trench and buried duct installations. While early generations of closures were relatively large in diameter and inflexible to installation requirements, later and present generation closures include flexible overmolded solutions on the order of only about a few inches in both diameter and length, thus facilitating installation in both aerial and buried environments. With regard to buried installations in particular, installation within these environments is typically difficult because of diameter constraints and having to work within a closed environment. Installation is especially difficult through about 1.25 inch diameter ducts, a common diameter requirement of telecommunications service providers.

Current FlexNAP systems typically include one or more tethers having lengths ranging from about a few feet to several hundred feet in length. In small diameter buried duct environments, the tether typically terminates in a low-profile tethered assembly including at least one connector, for example a multi-fiber (Con2r-MT) connector available from Corning Cable Systems of Hickory, N.C. During installation within a buried duct environment, it is often necessary to access the tethered assembly at a vault, hand hole, man hole or other buried structure, commonly referred to herein as a "hand hole", to connect the multi-fiber ferrule with another predetermined connector. Based on the number of tethered assemblies, varying tether lengths, locations of buried hand holes, the manner in which the FlexNAP system was installed and the engineering of the system itself, it is very difficult to ensure that each tethered assembly will be properly positioned and accessible at its predetermined hand hole. Most often, the distribution cable and only a portion of the tether length are visible at the hand hole, not the tethered assembly itself. Therefore, it is often necessary to detach or "unlash" the tether and tethered assembly from the distribution cable in order to pull the tether and tethered assembly back into the hand hole for access.

In aerial installation environments, the detachment of the tether may be as simple a process as going to each lashing location (where tape or tie-wraps are most commonly used) and removing or cutting each lashing along the length of the tether. In buried duct environments, this method of detaching the tether is much more difficult because of the lack of access to the lashings. Although it may be possible for an installation crew to manually remove the lashings by purposely overshooting each hand hole and then while pulling back to the proper position, remove the lashings as the distribution cable returns into the hand hole, this would be very manually labor intensive and require multiple operators working together from adjacent hand holes. Thus, what is needed is a way of releasing lashed tethers and tethered assemblies after cable assembly installation in order to allow the tethers and assemblies to be pulled into a hand hole or other buried structure for access. In particular, what is needed are remote tether release apparatus positioned along a cable along the length of the tether. Further, what is desired are remote tether release apparatus that allow a sufficient length of a tether to be released from the distribution cable from a hand hole at any point along the tether length, thus providing a cable assembly with a built-in feature for compensating for tap point placement errors that occur during system installation.

SUMMARY OF THE INVENTION

In one embodiment, the present invention provides various embodiments of tether release apparatus for cable assemblies including Flexible Network Access Points (FlexNAP) deployed in FTTx optical networks. The various tether release apparatus embodiments described herein allow a predetermined length of tether cable and its respective tethered assembly to be released from the distribution cable from a remote location along the length of the distribution cable away from the tethered assembly, thus facilitating tethered assembly access in installation environments, and in particular, buried duct environments at a hand hole. In other words, the tether cable may be released from a location remote from the tether's attachment point to its distribution cable. Remotely releasing the lashed tether and tethered assembly allows an improperly positioned tethered assembly to be released and pulled back into a hand hole for access without having the disturb or pull back the length of distribution cable. The released tether may also be routed to a desired location.

In another embodiment, the present invention provides tether release apparatus including a rip cord operable for tearing through tape or other lashing material used to lash the tether and tethered assembly to the distribution cable during cable installation. In one embodiment the ripcord may include, but is not limited to, a Kevlar reinforced thread or other ripcord material capable of withstanding installation and pulling forces. The ripcord and tape are installed in such a way as to secure the tether to the distribution cable while allowing the ripcord to be manually pulled through each lashing point. The ripcord may be wrapped around each lashing such that it tears through each lashing as it is pulled. A clamp or other anchor may be used to secure one end of the ripcord about the tap point. The ripcord may have a length about equal to or greater that the length of the tether, may run about parallel to the tether, and may be looped or otherwise wrapped around the lashings at predetermined positions along the tether length. To release the tether and tethered assembly, the ripcord may be pulled from a desired and convenient point, such as at a hand hole at which tethered assembly access is desired, and is pulled through the lashings. An alternative embodiment may include tying the ripcord around the tether as opposed to the distribution cable. Another embodiment may include a lashing cutting device that is pulled to cut the lashings and release the tether and tethered assembly.

In yet another embodiment, the present invention provides a remote tether release apparatus including a pull cord, and in some embodiments a pull rod, that runs about parallel to the tether and is anchored proximate the tap point at the upstream end and anchored about the tethered assembly at the downstream end. At the downstream end, the pull cord or rod is attached to a pin, spring, clip or other release apparatus suitable for releasing the anchored tethered assembly. The tether may be loosely held to the distribution cable using tape, tie-wraps or other fasteners that are torn, cut or released during tether detachment. Subsequent to cable assembly installation, an installer may access the pull cord in the hand hole or other location and pull it to release the pin, spring or clip maintaining the tethered assembly to the distribution cable. Once detached, the installer may then retract a portion of the tether length and the tethered assembly back through the duct, coil the slack within the hand hole and connect or reroute the tethered assembly as desired. If hand hole placement is missed all together, the distribution cable may be pulled in either a forward or backward direction in order to provide access to the tether release apparatus.

In yet another embodiment, the present invention provide tether release apparatus for FlexNAP systems including a distribution cable having at least one tap point and a tether attached/interconnected about the tap point. In one embodiment, the tether may terminate in a plug assembly including at least one connector. The tether release apparatus is anchored to the distribution cable about the tap point, runs parallel with the length of tether and is secured to plug assembly releasing structure about the plug assembly. The tether release apparatus may run about parallel to the distribution cable and may be secured at predetermined intervals along the distribution cable using clips, fasteners, corrugated tubing or other fastening means. In a specific embodiment, the tether release apparatus includes a multi-part clamp that tightens around the distribution cable as force is applied via a pulling apparatus. As the pulling apparatus is activated, force is applied through the clamp to a pulling/dust cap of the plug. As enough force is applied, the pulling/dust cap is released and the plug assembly is freed from the distribution cable. The tether may be secured to the distribution cable preferably using a non-adhesive wrapping material. A razor pull knife may be strung onto the pull cord and pulled underneath the wrapping material to slice it and release the tether cable.

In yet another embodiment, the present invention provides alternative tether release apparatus including, but not limited to, remote release clamps, pin releases, a solenoid actuated by applying a voltage across a trailing cable, cable actuated designs, overmolded junctions, and ratchet and pawl apparatus, among others. Alternative tether release apparatus may function to release a tethered plug assembly of other tethered assemblies from the distribution cable from a remote location in order to pull the assemblies to a predetermined location within the network.

Additional features and advantages of the invention will be set forth in the detailed description which follows, and in part will be readily apparent to those skilled in the art from that description or recognized by practicing the invention as described herein, including the detailed description which follows, the claims, as well as the appended drawings. It is to be understood that both the foregoing general description and the following detailed description present exemplary embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the detailed description, serve to explain the principles and operations thereof. Additionally, the drawings and descriptions are meant to be illustrative and not limiting.

BRIEF DESCRIPTION OF THE DRAWINGS

FIGS. 7A-C are perspective and partial cross-sectional views of another embodiment for remotely releasing a tether including an electronically activated solenoid.

DETAILED DESCRIPTION OF THE PREFERRED EMBODIMENTS

Figure 1A:
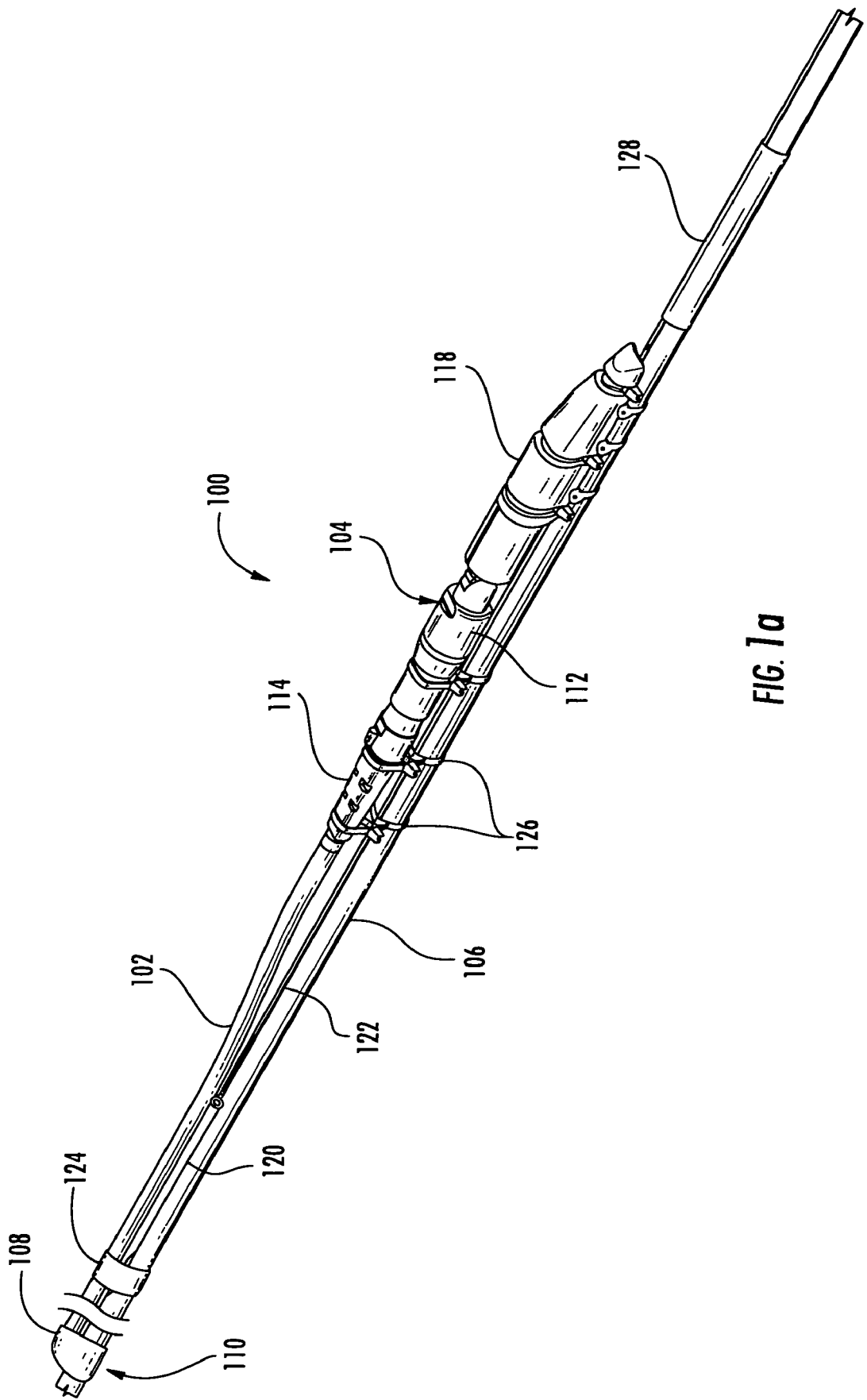
FIGS. 1A-C are perspective views of a portion of a FlexNAP cable assembly including one embodiment of an apparatus for remotely releasing a tethered and tethered assembly.

Reference will now be made in detail to the present preferred embodiments of the invention, and examples of which are illustrated in the accompanying drawings. Whenever possible, the same reference numerals will be used throughout the drawings to refer to the same or like parts. Although various embodiments of apparatus for remotely releasing a tether and tethered plug assembly of a FlexNAP cable assembly are described and shown throughout the figures, it is envisioned that other tethered plug release apparatus designs may perform a similar function as applied to any cable assembly in which it is desired to remotely release a portion of the cable assembly, such as freeing one or more cables from other one or more cables. The term FlexNAP ("Flexible Network Access Point") as used herein refers to a cable assembly including at least one flexible access point at which a preselected number of optical fibers are terminated and branched from the distribution cable. Throughout the specification and figures, the branched optical fibers are shown optically connected to a tether cable, the "tether", terminating in a plug assembly including at least one single fiber or multi-fiber connector. In alternative embodiments, the tether may terminate in splice ready optical fibers, a connection terminal or any other structure for presenting optical fibers of the tether for interconnection. The tether is preferably remotely released to facilitate access to the tether and plug assembly at a convenient access location within the network away from the plug assemblies location resulting from installation.

Figure 1B:
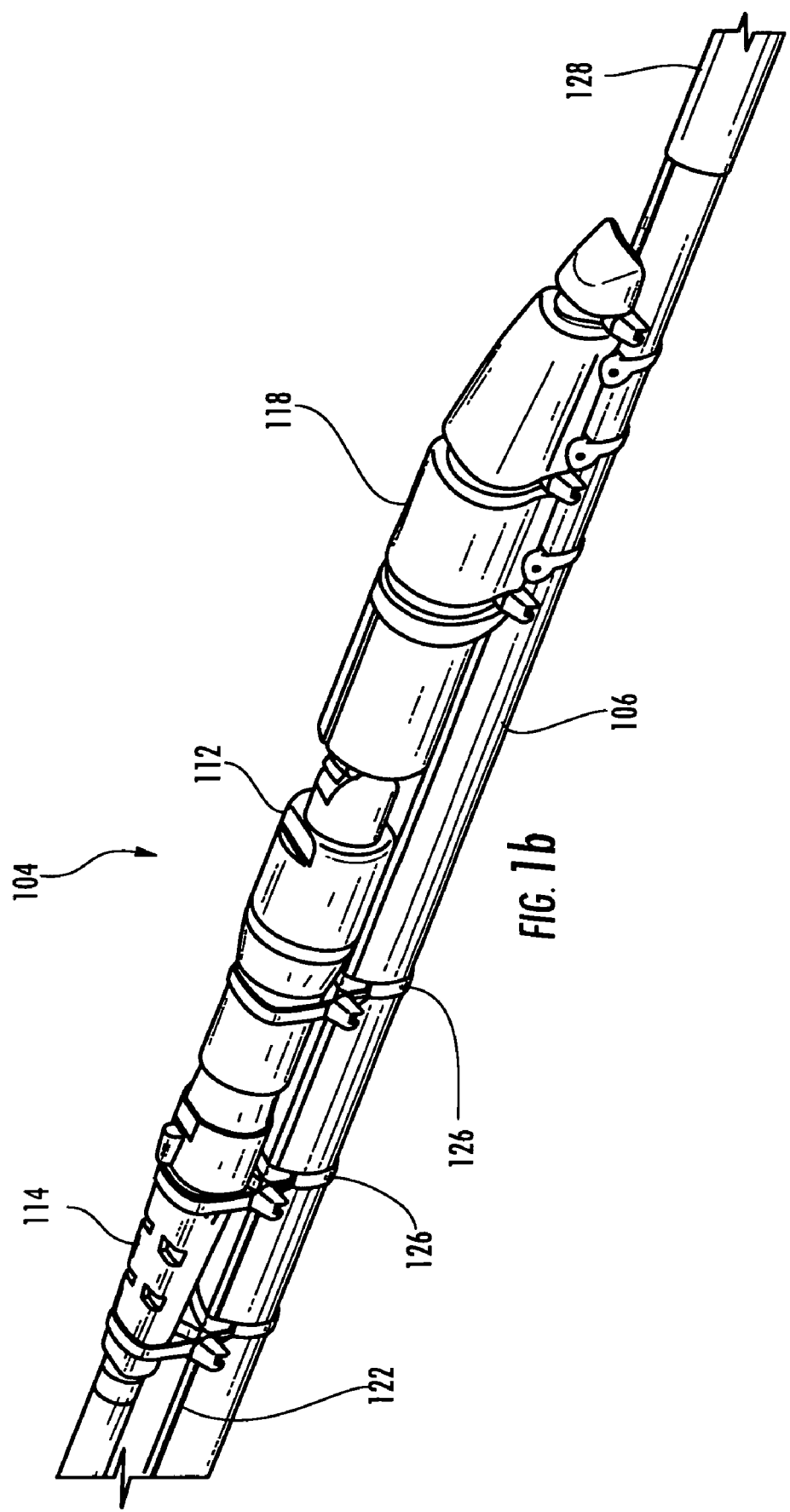
Figure 1C:
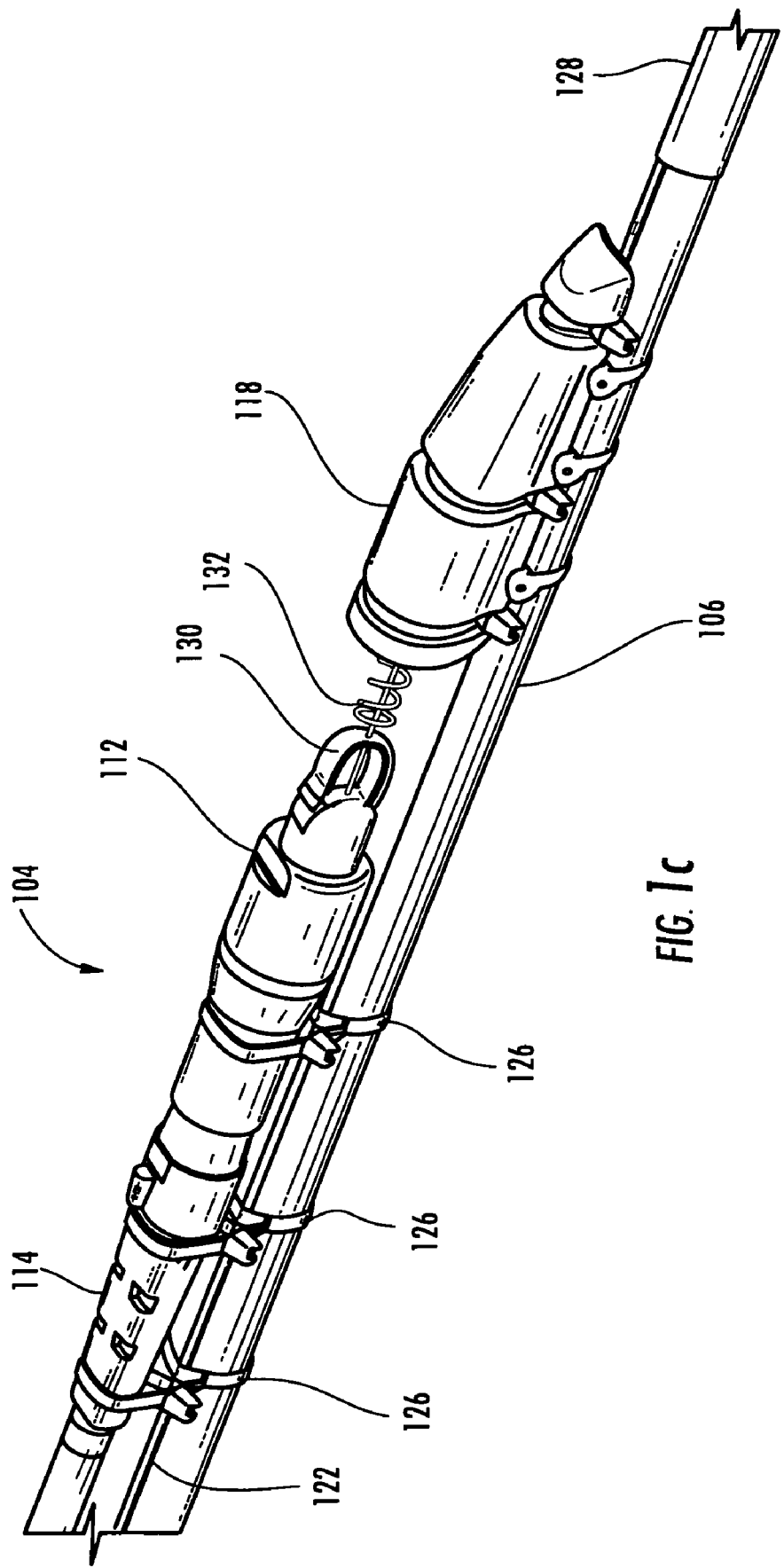

Referring to FIGS. 1A-C, a FlexNAP cable assembly 100 including apparatus for remotely releasing a tether 102 and plug assembly 104 is shown. The cable assembly includes a distribution cable 106 including a plurality of optical fibers (not shown). A flexible body 108 is overmolded about the distribution cable 106 at an access point 110 along the length of the distribution cable. The flexible body 108 functions to seal the cable access point, protects terminated and branched pre-selected optical fibers, and in some embodiments may serve as an attach point for the tether 102. A cable assembly 100 may include one or a number of network access points located along the cable length. The plug assembly 104 as shown includes at least one optical connector, a protective dust cap 112, and a flexible boot 114 for transitioning the tether 102 and hardened plug assembly components. As shown, the plug assembly is attached to a loopback device and the dust cap 112 of the loopback device includes a pulling grip 116 (FIG. 1C). The plug assembly 104 is protected during installation by an anchor 118 that possesses streamline geometry for facilitating cable assembly pulling through a buried duct environment.

Components of the remote release apparatus further include a pull cord 120 anchored at one end about the flexible body 108 and anchored at the other end about a rod 122. The pull cord 120 is sufficiently flexible and strong enough to withstand installation forces and preferably does not decrease the ability of the cable assembly 100 to flex during installation. For a cable assembly including about a 50 foot tether length, the pull cord 120 portion of the remote release apparatus runs the majority of the tether length, with the pull rod 122 running only a few feet of the tether length. The pull rod 122 may also be flexible, and the pull cord 120 preferably being more flexible than the pull rod 122. The tether 102 is routed about parallel to the distribution cable 106 and is lashed or otherwise fastened to the distribution cable at various intervals along the cables length using tie-wraps, tape, a wrapping, corrugated tubing or other suitable fasteners or lashes. As shown, the cable assembly 100 includes tape 124 at various positions along the pull cord length, and plastic fasteners 126 at various positions along the pull rod length. During remote release operation, as the pull cord 120 is pulled, the pull rod 122 is also pulled and slides through loops or other features of the fasteners 126, thus releasing the fasteners and the plug assembly 104. In other words, the fasteners 126 are held in position by the pull rod 126 and are released as the pull rod 126 is pulled through them. The pull cord 120 and/or pull rod 122 may further include a tape cutting device (not shown) for cutting the tape 124 as the device is pulled along the cable length. The pull rod 122 is removably secured in place at the downstream end either under the anchor 118 or by a heat shrink, tape or other pull rod securing component 128. Referring specifically to FIG. 1C, a pulling grip 130 of the dust cap or loopback cap may be removably attached to the anchor 118 with a flexible element 132 to allow a degree of stretch in the movement of the plug assembly 104 during installation without detachment. The anchor and the tap point preferably have a streamlined structure to facilitate bi-directional pulling.

Figure 2:
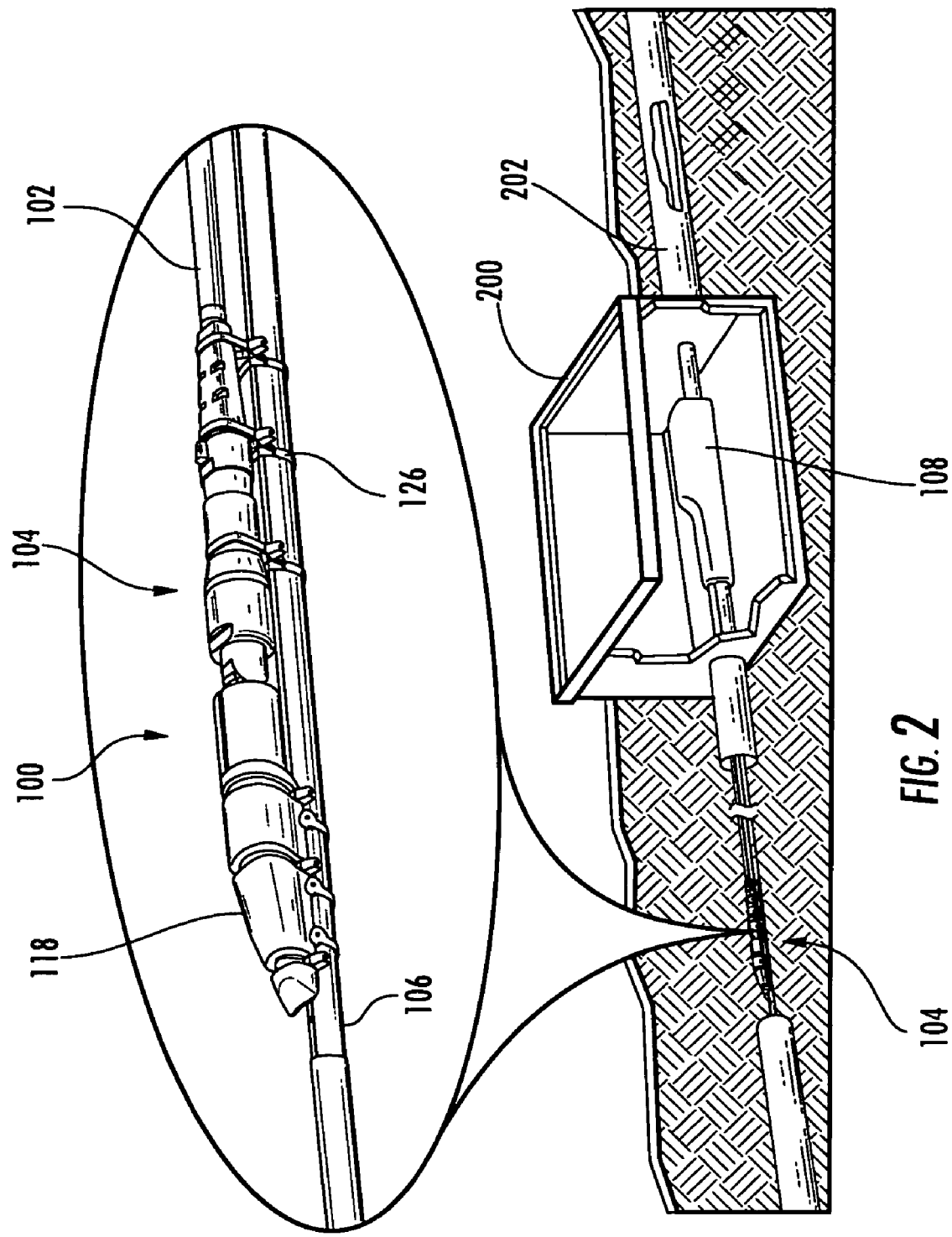
FIG. 2 is a perspective view of the FlexNAP cable assembly of FIGS. 1A-C shown installed within a buried duct environment including a hand hole.

Referring to FIG. 2, the cable assembly including the remote tether release apparatus of FIGS. 1A-C is shown installed within a buried duct environment including a hand hole 200 and a length of buried duct 202 in which the cable assembly is installed through. As shown, the plug assembly 104 after installation is not positioned within the hand hole. Thus, in order to access the at least one connector of the plug assembly, it is necessary to pull the plug assembly 104 back to the hand hole for access. This is accomplished by remotely releasing the tether 102 and plug assembly 104, such as from the hand hole 200, and pulling the tether 102 back into the hand hole until the plug assembly is pulled into the hand hole 200. Tether slack may be coiled as needed. The tether and plug assembly may be released using one of the remote release apparatus described herein or using an equivalent release apparatus within the scope of the present invention. The tether 102 is preferably capable of being released at any location along the length of the tether, thus relaxing the need for positioning a specific component of the cable assembly within the hand hole. In other words, it would be as equally difficult to place a single tether release point in the hand hole as it would be to place the plug assembly in the hand hole.

Figure 3:
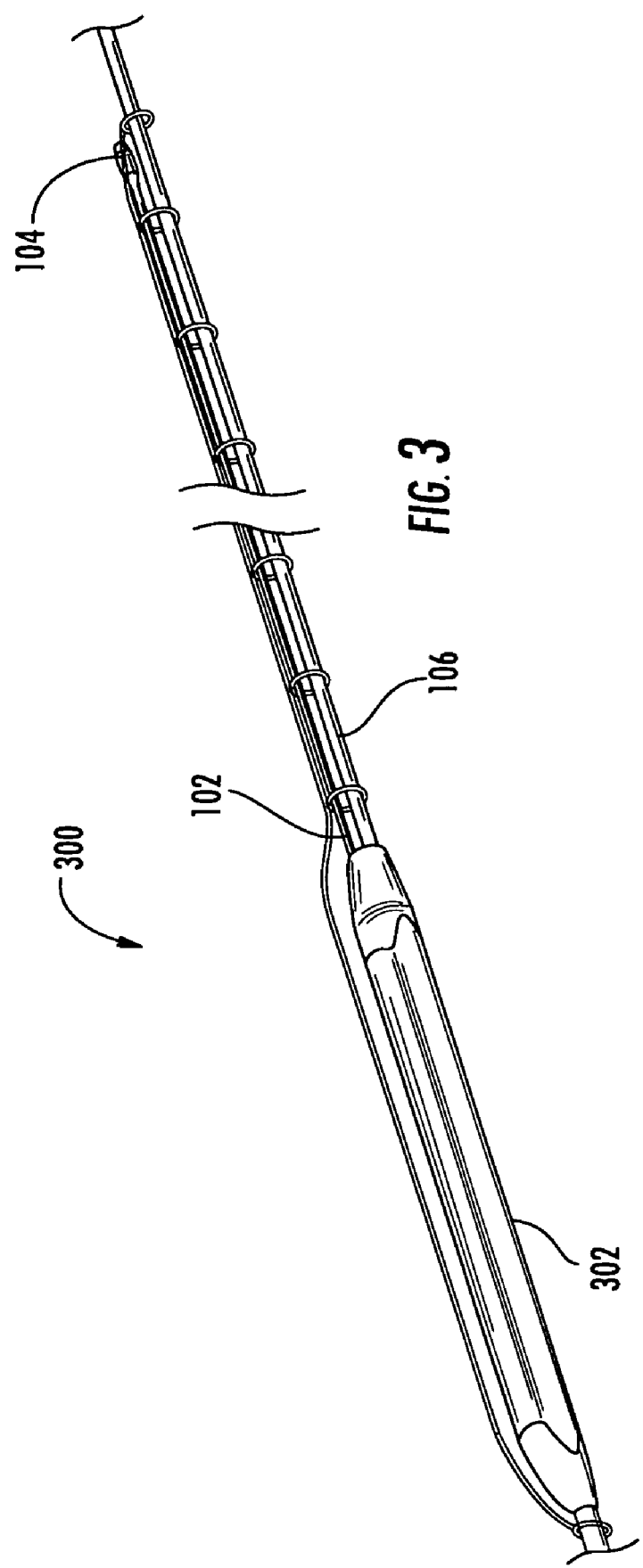
FIG. 3 is a perspective view of another embodiment of an apparatus for remotely releasing a tether and plug assembly of a FlexNAP cable system including a pull cord.

Referring to FIG. 3, another embodiment of a cable assembly 300 including a remote tether release is shown. The cable assembly 300 includes a flexible overmolded access location 302 of greater length than that in FIGS. 1A-C, and also includes a distribution cable 106 and tether 102 secured about the overmolded access location 302. The tether 102 and plug assembly 104 are shown lashed to the distribution cable by a plurality of lashings 124, such as tape. A rip cord 120 operable for tearing through the tape or other lashing material may comprise, but is not limited to, a Kevlar reinforced thread or other ripcord material capable of withstanding installation and pulling forces. The ripcord 120 and tape is installed in such a way as to secure the tether to the distribution cable 106 about the cable access point while allowing the ripcord 120 to be manually pulled through each lashing. A clamp or other anchor may be used to secure one end of the ripcord 120 about the tap point. The ripcord 120 may have a length about equal to or greater that the length of the tether 102, runs substantially parallel to the tether 102, and may be looped or otherwise wrapped around the lashings at predetermined positions along the tether length. To release the tether 102 and plug assembly 104, the ripcord 120 is pulled from a desired and convenient point, such as at a hand hole at which rip cord access is possible. An alternative embodiment may include tying the ripcord around the tether as opposed to the distribution cable. Another embodiment may include a lashing cutting device that is pulled to cut the lashings and release the tether and tethered assembly. In all embodiments of the present invention, the ripcord 120 may be anchored at a predetermined position upstream of the access location to allow access to the rip cord at a desired point should the access location also be installed downstream of the hand hole.

Figure 4A:
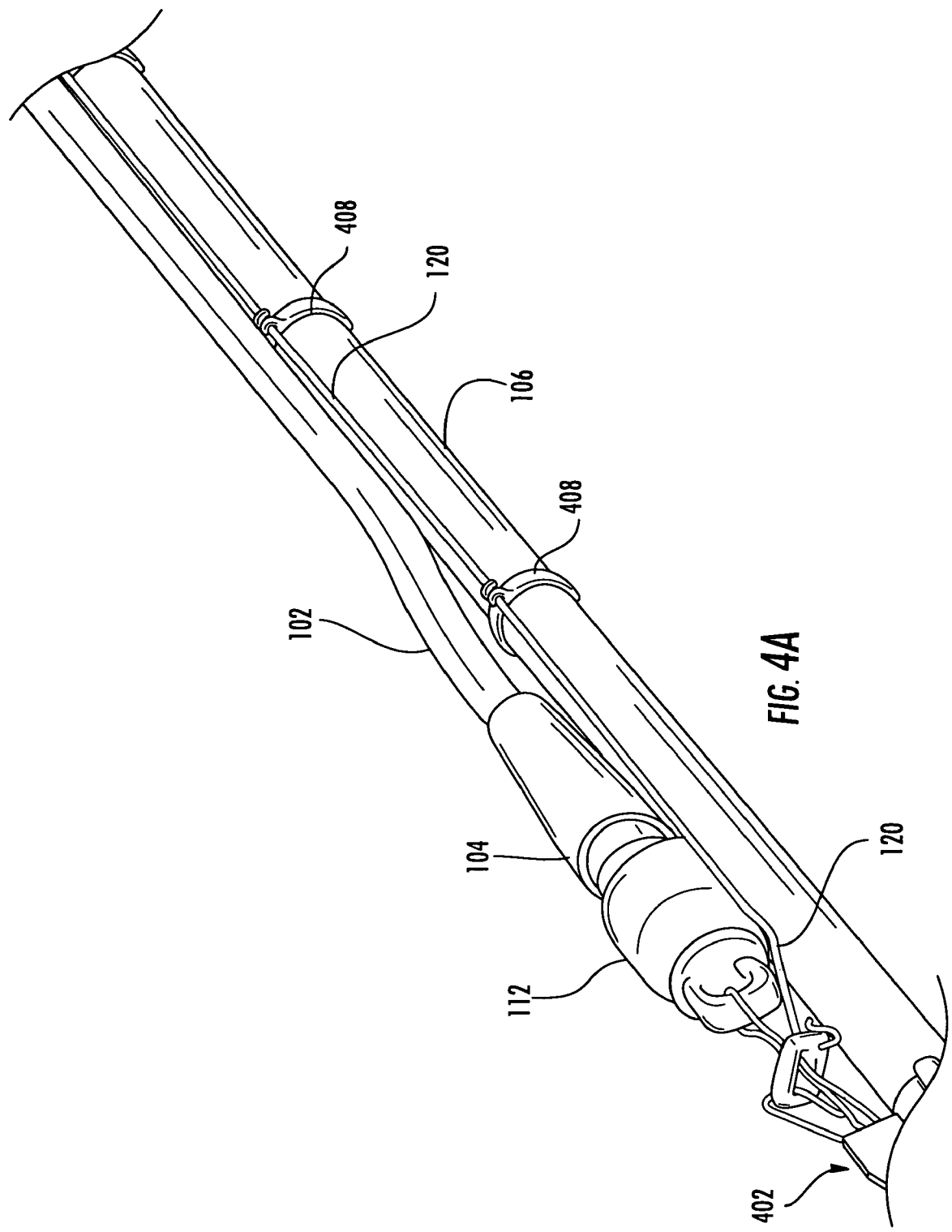
FIG. 4A is a perspective view of another embodiment of an apparatus for remotely releasing a tether and plug assembly of a FlexNAP cable assembly including a distribution cable clamp attached to a dust cap of the plug assembly.
Figure 4B:
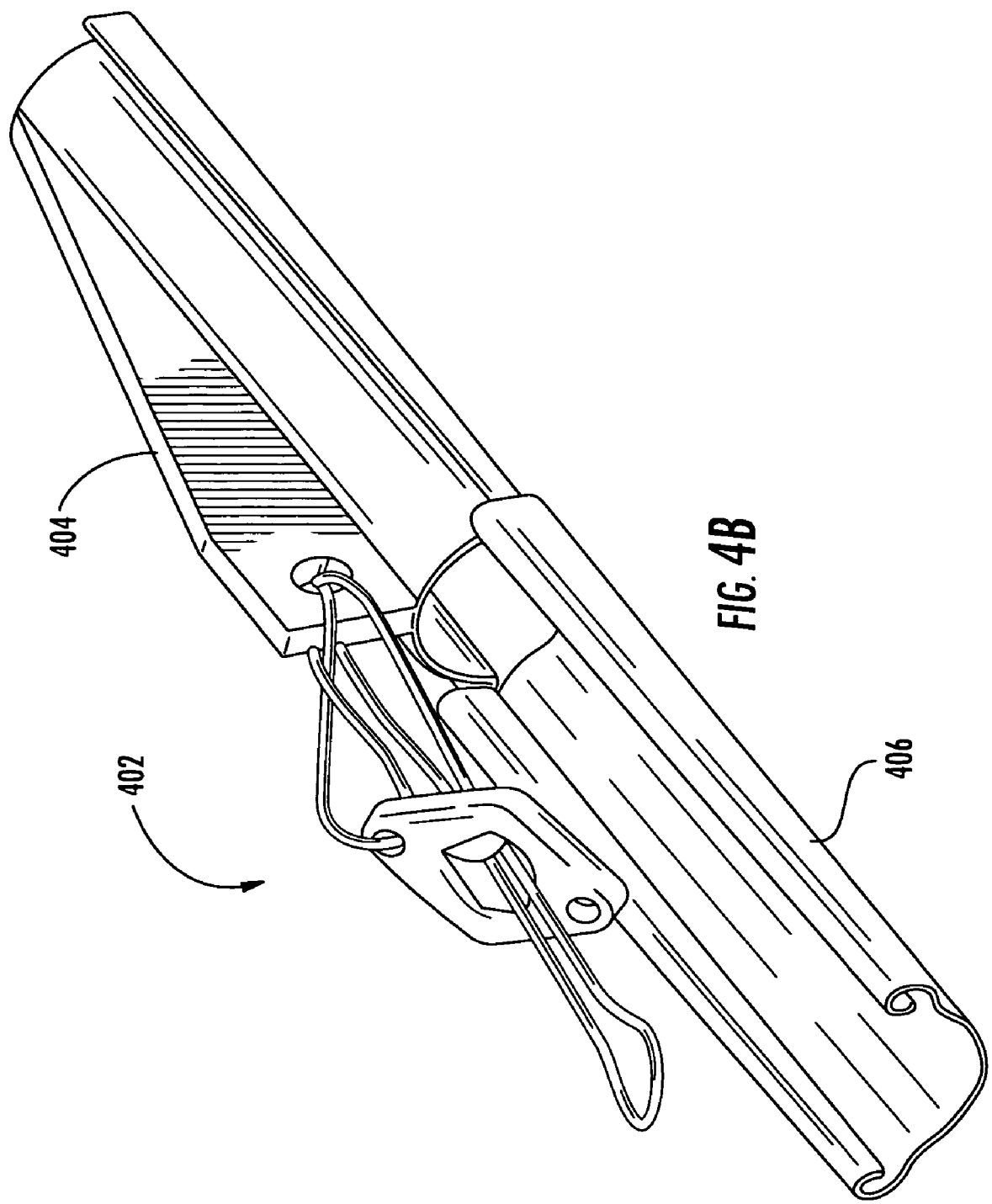
FIG. 4B is a perspective view of the distribution cable clamp of FIG. 4A.
Figure 4C:
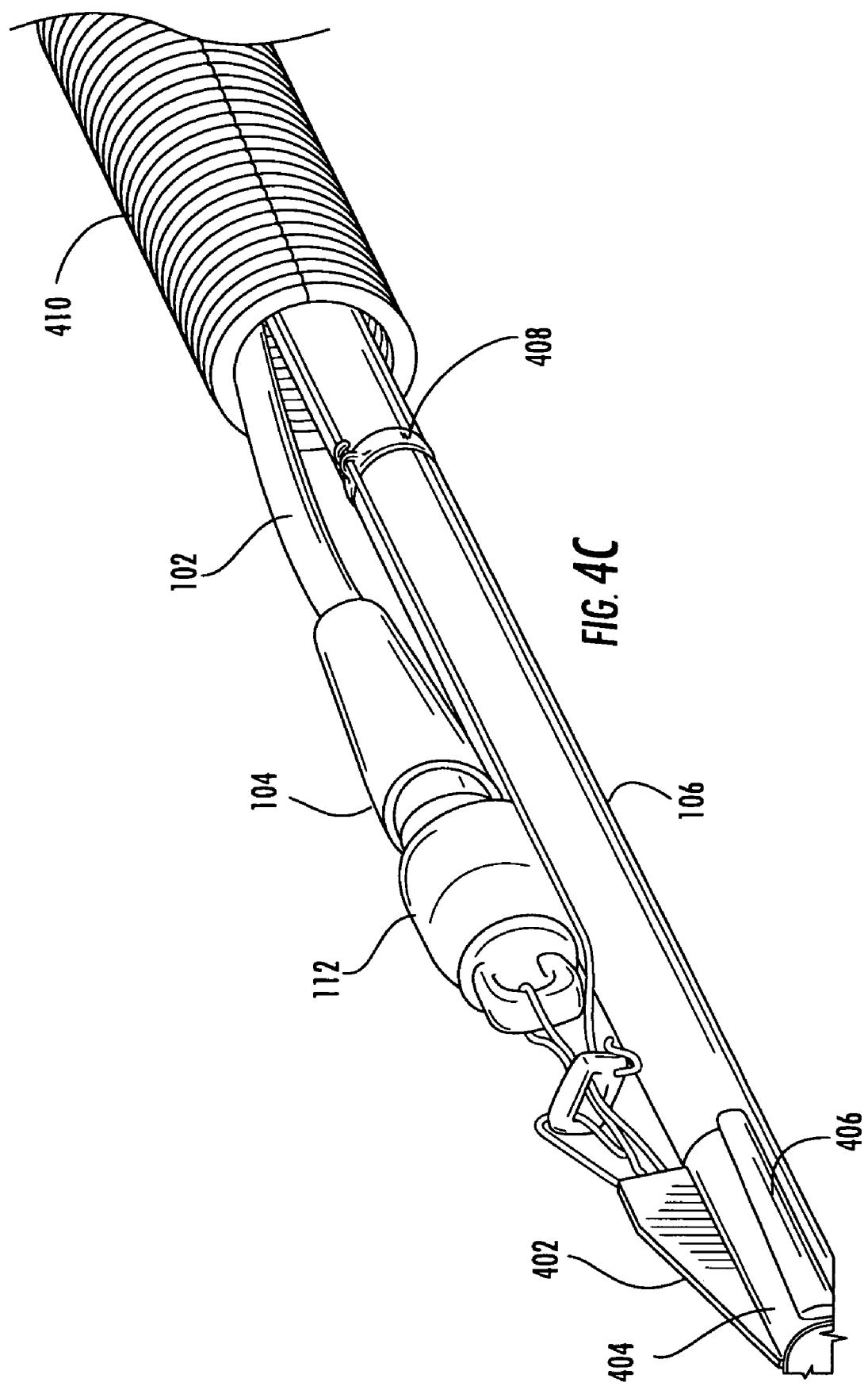
FIG. 4C is a perspective view of the FlexNAP cable assembly of FIG. 4A further including corrugated tubing covering a portion of the length of tether and distribution cable.

Referring to FIGS. 4A-C, another embodiment of a remote tether release apparatus and detailed component views are shown. The cable assembly 400 includes a distribution cable 106, a tether 102 having a predetermined length, a plug assembly 104 located at the downstream end of the tether, and remote tether release. As in the previous embodiments, and all embodiments to follow, the tether 102 can be accessed at any point from a single location to release the full length of tether 102 and plug assembly 104. The plug assembly is protected during installation and until needed with a protective dust cap 112. Although not shown, the plug assembly 104 may include a loopback device for looping optical signals transmitted downstream through the tether 102 back upstream for detection at the optical signal transmission source.

The remote tether release apparatus includes a multi-part clamp 402, wherein a wedge-sliding action of the clamp 402 causes portions 404 and 406 to tighten around the distribution cable 106 as pulling force is applied to a pull cord 120. The pull cord 120 has a length about equal to the length of the tether 102 and runs about parallel to the tether. The pull cord 120 is secured to the distribution cable 106 using clips 408 or other like fasteners. As shown, the clips 408 are not secured around the tether 102, thus as the pull cord 120 is pulled the plug assembly 104 is released from attachment and the tether 102 and plug assembly 104 can be pulled back to the hand hole. In an alternative embodiment, the clips 408 may also be secured around the tether 102 and released as the pull cord 120 is pulled. The pull cord 120 may also be used to apply a clamping force to the clamp 402, holding it in place, while the plug assembly 104 is pulled loose of the clamp 402 by pulling on the tether 102. As shown in FIG. 4C, a substantial portion of the common length of the tether 102 and the distribution cable 106 may be covered with a split corrugated tubing 410 for protection and to maintain the tether 102 and distribution cable 106 together during installation and until the tether 102 is pulled back.

Figure 5:
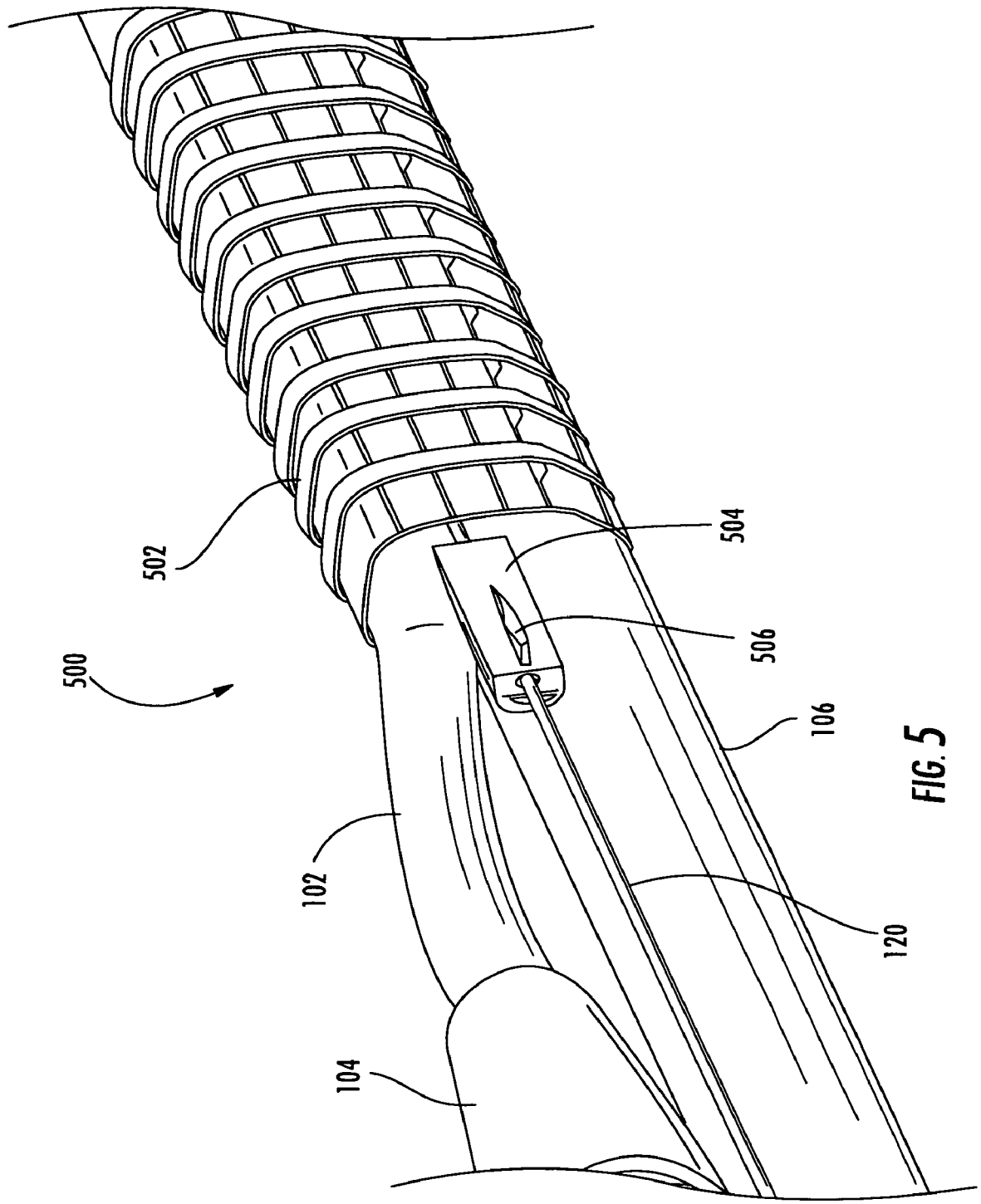
FIG. 5 is a perspective view of another apparatus for remotely releasing a tether and plug assembly including a cable wrapping and wrapping slitting device.

Referring to FIG. 5, another embodiment of a cable assembly 500 including remote tether release is shown. The tether 102 and distribution cable 106 are maintained using a wrap 502 that runs at least a portion of the length of the tether and distribution cable. A pull cord 120 is anchored about an access location of the distribution cable. The pull cord 120 includes a wrapping slitting/cutting device 504 including a blade 506. The device 504 cuts the wrapping 502 as it is pulled to release the tether 102 from the distribution cable 106.

Figure 6A:
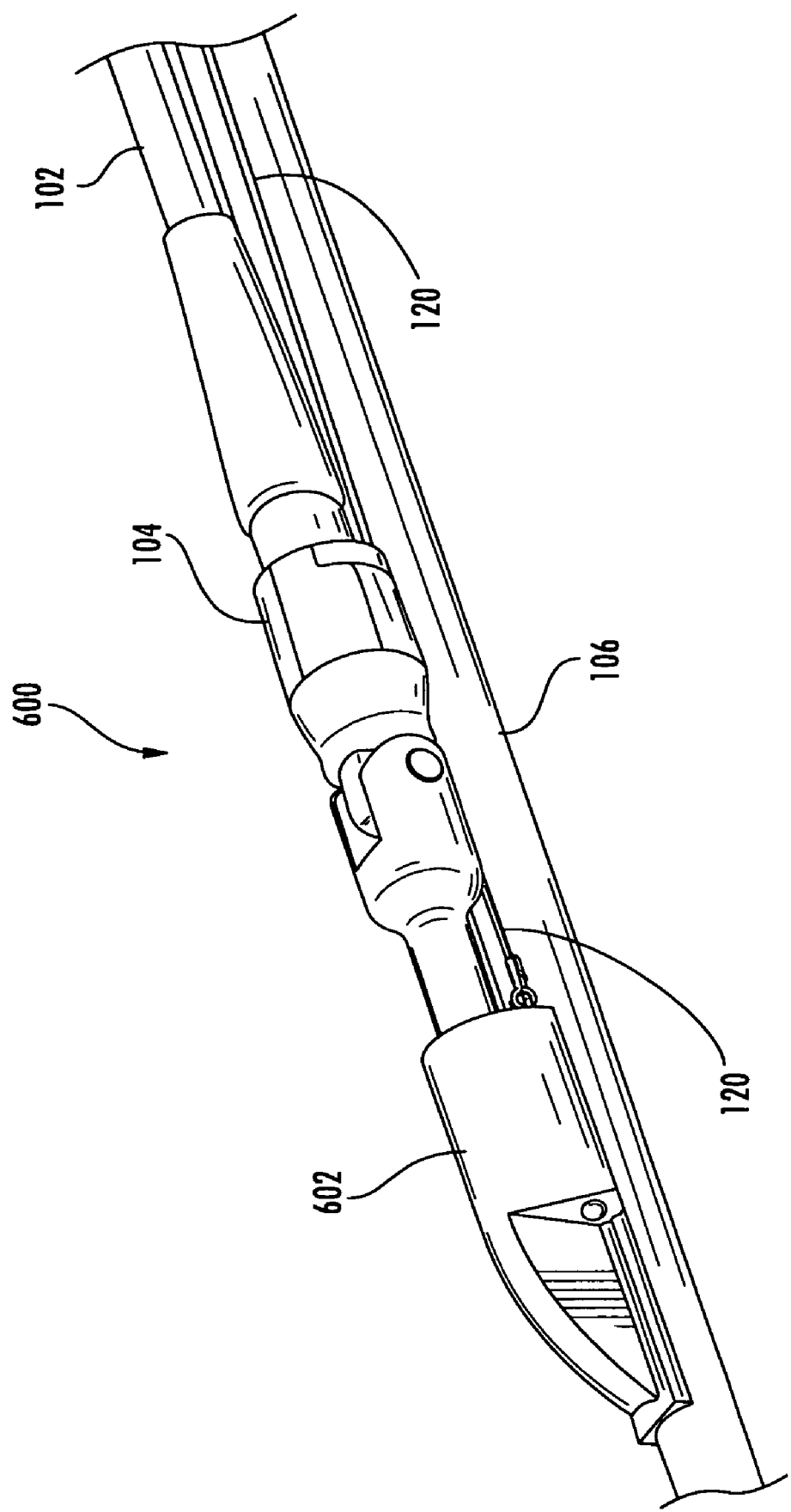
FIGS. 6A-B are perspective views illustrating another embodiment of a remote tether release apparatus.
Figure 6B:
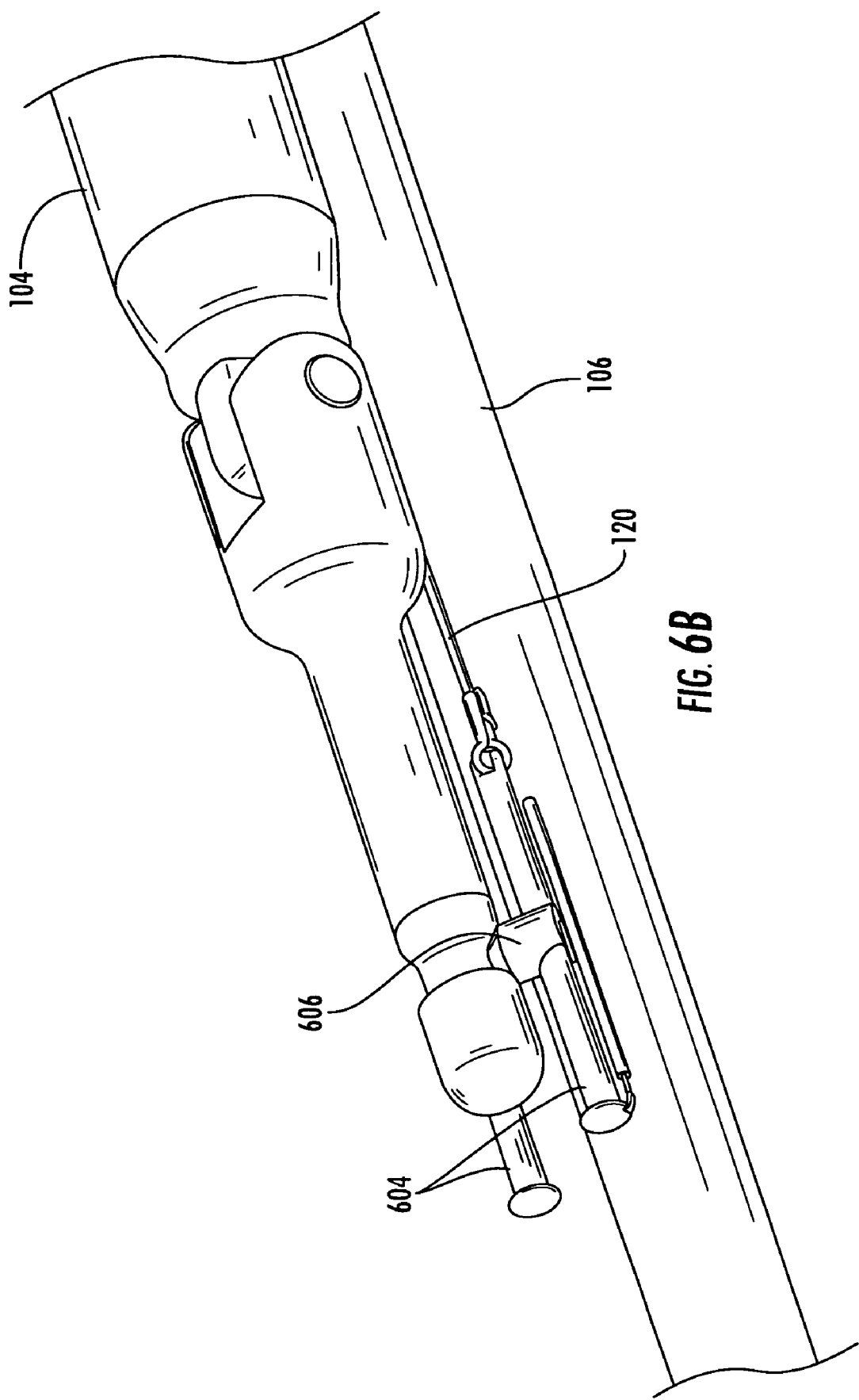

Referring to FIGS. 6A-B, another embodiment of a cable assembly 600 is shown including another embodiment of a tether release apparatus. The tether 102 and its respective plug assembly 104 are released from the distribution cable 106 using a remote release clamp 602. As shown, the cable assembly includes a Con2r™ plug available from Corning Cable Systems of Hickory, N.C. The clamp 602 is remotely released, meaning that the clamp is not released at the clamp itself, but by using a pull cord 120 that may be pulled from any single location along the length of the pull cord. The pull cord 120 is anchored about an access location of the distribution cable 106 from which the tether 102 originates or is secured. Referring specifically to FIG. 6B, the pull cord 120 is used to pull two retaining pins 604 out, allowing plungers 606 to move aside when the tether 102 is pulled, thus releasing the plug assembly from attachment.

Figure 7B:
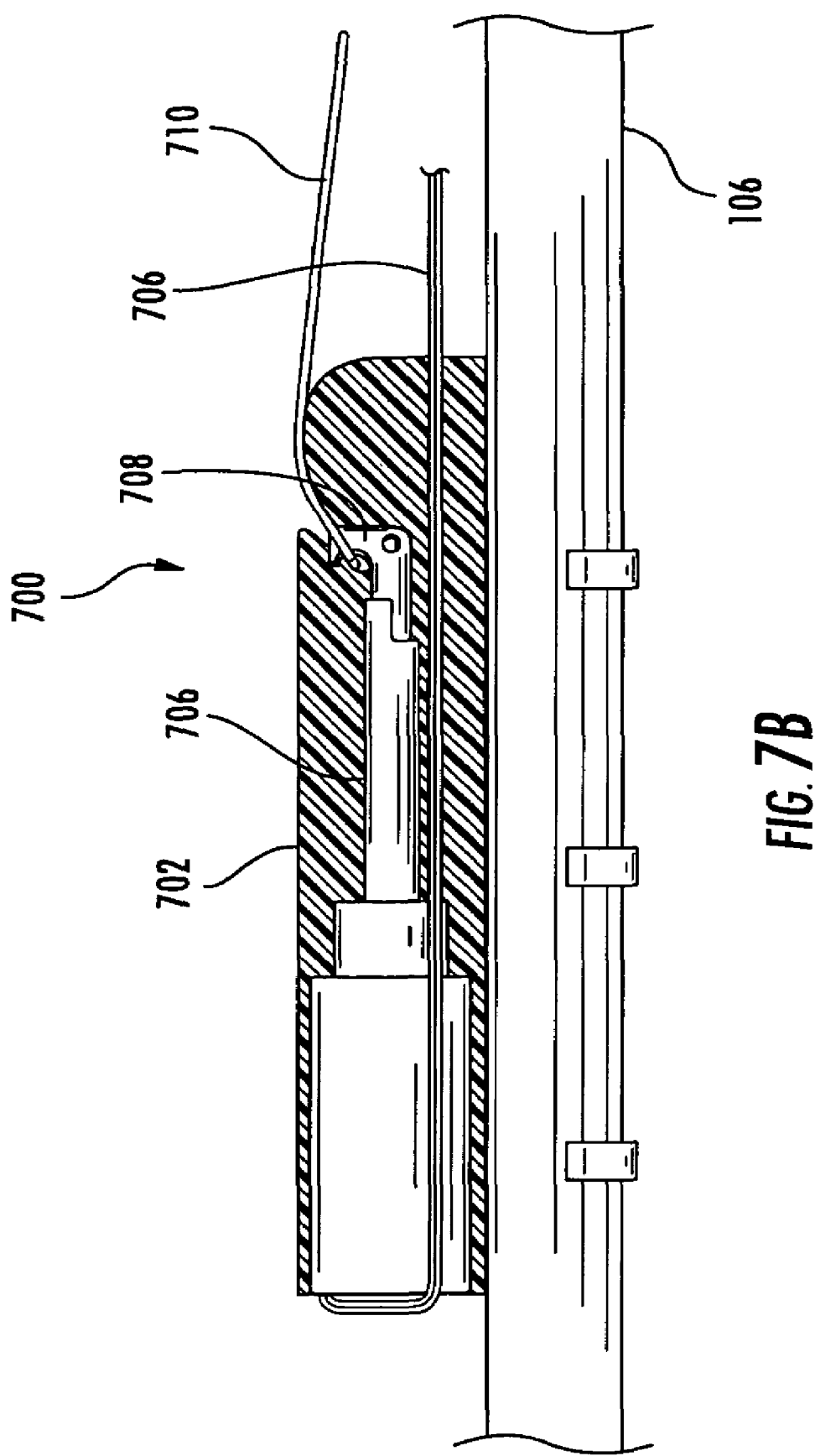
Figure 7C:
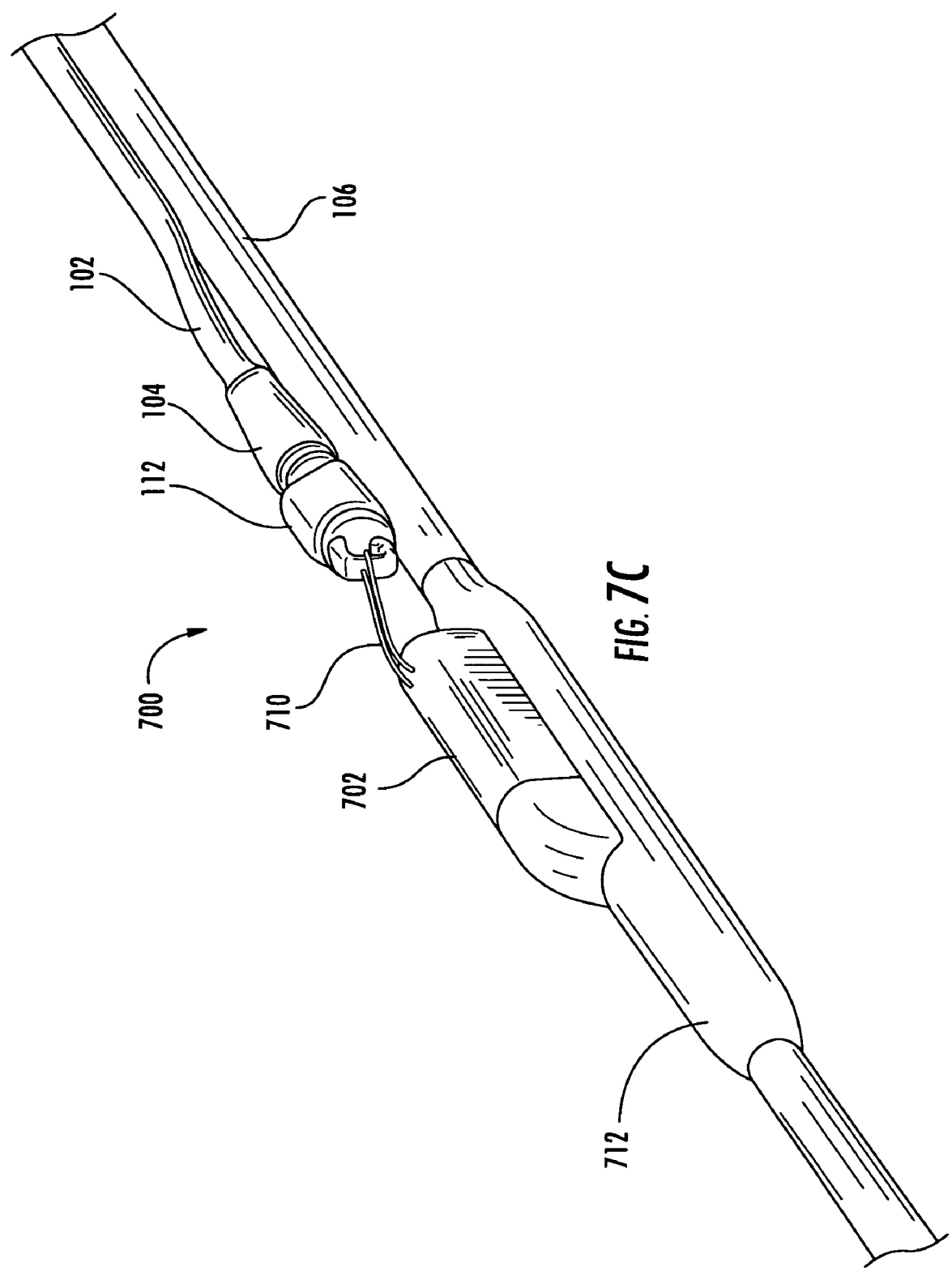

Referring to FIGS. 7A-C, another embodiment of cable assembly 700 including a remote tether release is shown. This embodiment is particularly useful in cable assemblies including long tether 102 lengths, where tether release using a pull cord may be difficult. The cable assembly 700 includes an electronically activated solenoid 702 powered by at least one wire 704 that runs about equal to the length of the tether 102. In one example, the solenoid may be about a 0.5 inch by about a 1 inch solenoid, about 0.1 in nominal pull and about 9.6 vdc min operated. The solenoid 702 is anchored to the distribution cable 106 about the plug assembly 104 of the assembly 700. As the solenoid 702 is activated, a piston 706 including a portion 708 for grabbing a lanyard 710 is moved, thus releasing the plug assembly 104 from its dust cap 112. The solenoid 702 may also be used to release the plug assembly from another structure, leaving the dust cap in place during tether pull back. Referring specifically to FIG. 8C, a portion of the remote tether release structure may be secured to the distribution cable using an overmolded structure 712 that also aids in streamlining the assembly.

While various embodiments for remote tether release have been shown, alternative designs may exist for performing the same or similar function. It is intended that the present invention cover such alternative embodiments. In addition, although remote tether release has been shown as applied to pre-engineered fiber optic cable assemblies, it is envisioned that the methods and apparatus may be applied to any cable assembly in which it is desired to remotely release at least one cable from another cable. It is apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. A cable assembly, comprising:
   a first fiber optic cable;
   a second fiber optic cable attached to the first fiber optic cable; and
   an apparatus for remotely releasing at least a portion of the second fiber optic cable from attachment to the first fiber optic cable, wherein the first and the second fiber optic cables are maintained together by at least one lashing.

2. The cable assembly of claim 1, wherein the first fiber optic cable is a distribution cable including at feast one optical fiber, and the second fiber optic cable is a tether including at least one optical fiber optically connected with one or more pre-selected optical fibers of the at least one optical fiber of the first fiber optic cable at an access point along the first fiber optic cable.

3. The cable assembly of claim 2, wherein the tether terminates in a fiber optic plug assembly including at least one optical connector.

4. The cable assembly of claim 3, further comprising an anchor positioned about the fiber optic plug assembly.

5. The cable assembly of claim 1, wherein the apparatus includes a pull cord for releasing one or more attachment positions and unlashing the at least one lashing.

6. A cable assembly, comprising:
   a distribution cable;
   a tether cable attached and optically interconnected to the distribution cable at a first position, and removably attached to the distribution cable at one or more second positions; and
   a tether cable release apparatus for remotely releasing at least a portion of the tether cable from the distribution cable.

7. The cable assembly of claim 6, wherein the tether cable release apparatus remotely releases a tethered assembly positioned about a downstream end of the tether cable.

8. The cable assembly of claim 7, wherein the tethered assembly is a fiber optic plug assembly including at least one optical connector.

9. The cable assembly of claim 7, wherein the tether cable release apparatus includes a pull cord anchored at the first position and removably secured about the tethered assembly.

10. The cable assembly of claim 6, wherein the tether cable release apparatus is further operable for unlashing at least one cable lashing.

11. The cable assembly of claim 10, further comprising a cable lashing cutting device.

12. The cable assembly of claim 6, wherein the tether cable release apparatus comprises an electrically activated solenoid.

13. The cable assembly of claim 6, wherein the tether release apparatus comprises a remote release clamp.

14. The cable assembly of claim 6, wherein the tether release apparatus allows the at least a portion of the tether cable to be released from the distribution cable in order to pull the at least a portion of the tether cable back into a hand hole of a buried duct system for access.

15. A cable assembly, comprising:
a distribution cable including a plurality of optical fibers and at least one access location positioned along the distribution cable wherein at least one pre-selected optical fiber of the distribution cable is accessed and terminated;
a tether including at least one optical fiber optically connected with the at least one pre-selected optical fiber of the distribution cable, wherein the tether is secured at a first end about the at least one access location and is releasably secured at one or more attachment positions along its length to the distribution cable; and
a tether release apparatus for releasing at least a portion of the tether from the distribution cable from a location remote from the one or more attachment positions.

16. The cable assembly of claim 15, wherein the tether terminates in a plug assembly that is attached to the distribution cable during installation and is released by the tether release apparatus in order to route the plug assembly to a location remote from its attachment point.

17. The cable assembly of claim 15, wherein the tether release apparatus comprises a pull cord.

18. The cable assembly of claim 15, further comprising at least one lashing for maintaining the distribution cable and tether, and wherein the tether release apparatus is operable for unlashing the at least one lashing.

19. The cable assembly of claim 15, wherein the tether release apparatus comprises a releasable clamp.

20. A cable assembly, comprising:
a fiber optic distribution cable including a plurality of optical fibers and at least one access location for terminating and routing at least one pre-selected optical fiber away from the distribution cable;
a tether cable including at least one optical fiber optically connected to the at least one preselected optical fiber, the tether cable being releasably attached to the distribution cable at one or more attachment points; and an apparatus for releasing at least a portion of the tether cable from the distribution cable at a location remote from the one or more attachment points, wherein the apparatus includes a pull cord for releasing the one or more attachment points.

21. The cable assembly of claim 20, wherein the tether cable terminates in a fiber optic plug assembly including at least one optical connector.

22. The cable assembly of claim 21, further comprising an anchor positioned about the fiber optic plug assembly.

23. The cable assembly of claim 20, wherein the apparatus includes a lashing cutting device.

24. The cable assembly of claim 20, wherein the apparatus includes an electronically activated solenoid.

* * * * *